United States Patent [19]

Yoshizu et al.

[11] Patent Number: 4,986,117
[45] Date of Patent: Jan. 22, 1991

[54] METHOD FOR DETECTING FUEL INJECTION PERFORMANCE OF FUEL INJECTION VALVE

[75] Inventors: Fumitsugu Yoshizu; Kazuhiko Sato, both of Higashimatsuyama, Japan

[73] Assignee: Diesel Kiki Co., Ltd., Tokyo, Japan

[21] Appl. No.: 497,613

[22] Filed: Mar. 23, 1990

[30] Foreign Application Priority Data

Mar. 27, 1989 [JP] Japan ................................. 1-71802

[51] Int. Cl.$^5$ ............................................. G01M 19/00
[52] U.S. Cl. ................................. 73/119 A; 73/861.18
[58] Field of Search ................ 73/119 A, 861.18, 168; 364/431.05

[56] References Cited

U.S. PATENT DOCUMENTS 4,893,750 1/1990 Haworth ...................... 73/119 A X

FOREIGN PATENT DOCUMENTS 61-144267 9/1986 Japan .
985389 12/1982 U.S.S.R. .......................... 73/119 A Primary Examiner—Jerry W. Myracle
Attorney, Agent, or Firm—Pollock, VandeSande & Priddy

[57] ABSTRACT

In a method for detecting the fuel injection performance of a fuel injection valve in which a nozzle needle biased by a spring member for establishing valve opening pressure is lifted off from the valve seat when pressurized fuel is supplied thereto, electric data corresponding to the wave form of the shock wave produced in the spring member when fuel is injected is detected at one end of the spring member, and time-course change in the pressure of injected fuel acting on the nozzle needle during the fuel injection operation is determined on the basis of the time-course change in magnitude of the shock wave returning from the nozzle needle side end in the spring member by reflection, whereby various fuel injection factors can be calculated from the determined pressure of injected fuel acting on the nozzle needle during the fuel injection operation.

10 Claims, 2 Drawing Sheets

METHOD FOR DETECTING FUEL INJECTION PERFORMANCE OF FUEL INJECTION VALVE

BACKGROUND OF THE INVENTION

1. Field of the Invention

The present invention relates to a method for detecting injection performance in fuel injecting operation of a fuel injection valve, and more particularly to a method for detecting injection timing, the amount of injection and the fuel injection rate in a fuel injection valve for internal combustion engines.

2. Description of the Prior Art

Up to now there has been widely used a fuel injection valve provided with a nozzle needle and a pressure spring for biasing the nozzle needle toward the associated valve seat, and as soon as pressure exerted by the supply of the pressurized fuel exceeds the tension of the pressure spring, pressure acting on the pressure taper of the nozzle needle causes the nozzle needle to be lifted off the valve seat and fuel is injected from the injection hole or holes into the combustion chamber. For detecting the fuel injection performance of the fuel injection valve of the type described above, Japanese Utility Model Application Public Disclosure No. Sho 61-144267 discloses a detecting system in which a piezoelectric element is provided for detecting changes in the tension of the pressure spring and the time at which the the fuel injection starts is detected on the basis of the level of the output voltage developed across the opposite surfaces of the piezoelectric element.

However, since the proposed detection system is directed to detection of only the time at which injection of fuel begins on the basis of change in the level of the voltage signal representing the force produced in the pressure spring at the beginning of fuel injection, it is impossible for the proposed detection system to detect fuel injection parameters other than the time at which injection of fuel begins, and specifically for it to detect the fuel injection rate, the amount of fuel injected and the like.

SUMMARY OF THE INVENTION

It is an object of the present invention to provide an improved method for detecting the fuel injection performance of fuel injection valves.

It is another object of the present invention to provide a method for detecting various injection performance factors of a fuel injection valve by means of a single sensor.

It is a further object of the present invention to provide a method for detecting the injection start time, the quantity of fuel injected and the fuel injection rate of a fuel injection valve for internal combustion engines.

According to the present invention, in a method for detecting the injection performance of a fuel injection valve in which a nozzle needle is biased toward an associated valve seat by a spring member in such a way that the nozzle needle is lifted off from the valve seat to inject fuel when pressurized fuel is supplied thereto, the time-course change in level of a shock wave produced in the spring member when fuel is injected is detected on one end of the spring member, and the time-course change in the pressure of injected fuel at the tip of the nozzle needle is detected on the basis of the time-course change in magnitude of the shock wave returning from the nozzle needle side end in the spring by reflection. Thus, the various fuel injection performance factors of the fuel injection valve can be detected on the basis of the change in the pressure of fuel injected.

The inventors focused on the fact that a shock wave is produced at one end of the spring member when the nozzle needle is lifted off suddenly at the time fuel is injected in response to the supply of pressurized fuel to the nozzle needle and reciprocates between the opposite ends of the spring member. From their study of this phenomenon they learned that the magnitude of the returning shock wave produced at the time the shock wave is reflected at the end of the spring member on the nozzle needle side depends upon the fuel pressure at the tip of the nozzle needle at that time. The present invention is based on this knowledge.

The nozzle needle is lifted off from the valve seat to inject fuel when fuel pressure acting on the pressure taper of the nozzle needle exceeds the tension of the spring member. At the same time, a shock wave is produced in the spring member due to the impact on the end of the spring member on the nozzle needle side. This shock wave travels to and fro between the opposite ends of the spring member because of the reflection at each end of the spring member.

Furthermore, the magnitude of the reflected shock wave varies depending upon the condition at the end portion of the spring member at the time of reflection. In particular, the condition at the end portion of the spring member on the nozzle needle side depends almost entirely upon the fuel pressure at that time, so that the fuel injection condition can be detected on the basis of the condition or magnitude of the shock wave, coming from the end of the spring member on the nozzle needle side.

The time-course change in magnitude of the shock wave coming from the end of the spring member on the nozzle needle side can be determined by means of a piezoelectric element on the basis of the change in the shock wave detected on the one end of the spring member, whereby information concerning the change in the state of fuel injection with the passage of time can be obtained.

The invention will be better understood and other objects and advantages thereof will be more apparent from the following detailed description of preferred embodiment with reference to the accompanying drawings.

DESCRIPTION OF THE PREFERRED EMBODIMENT

Figure 1:
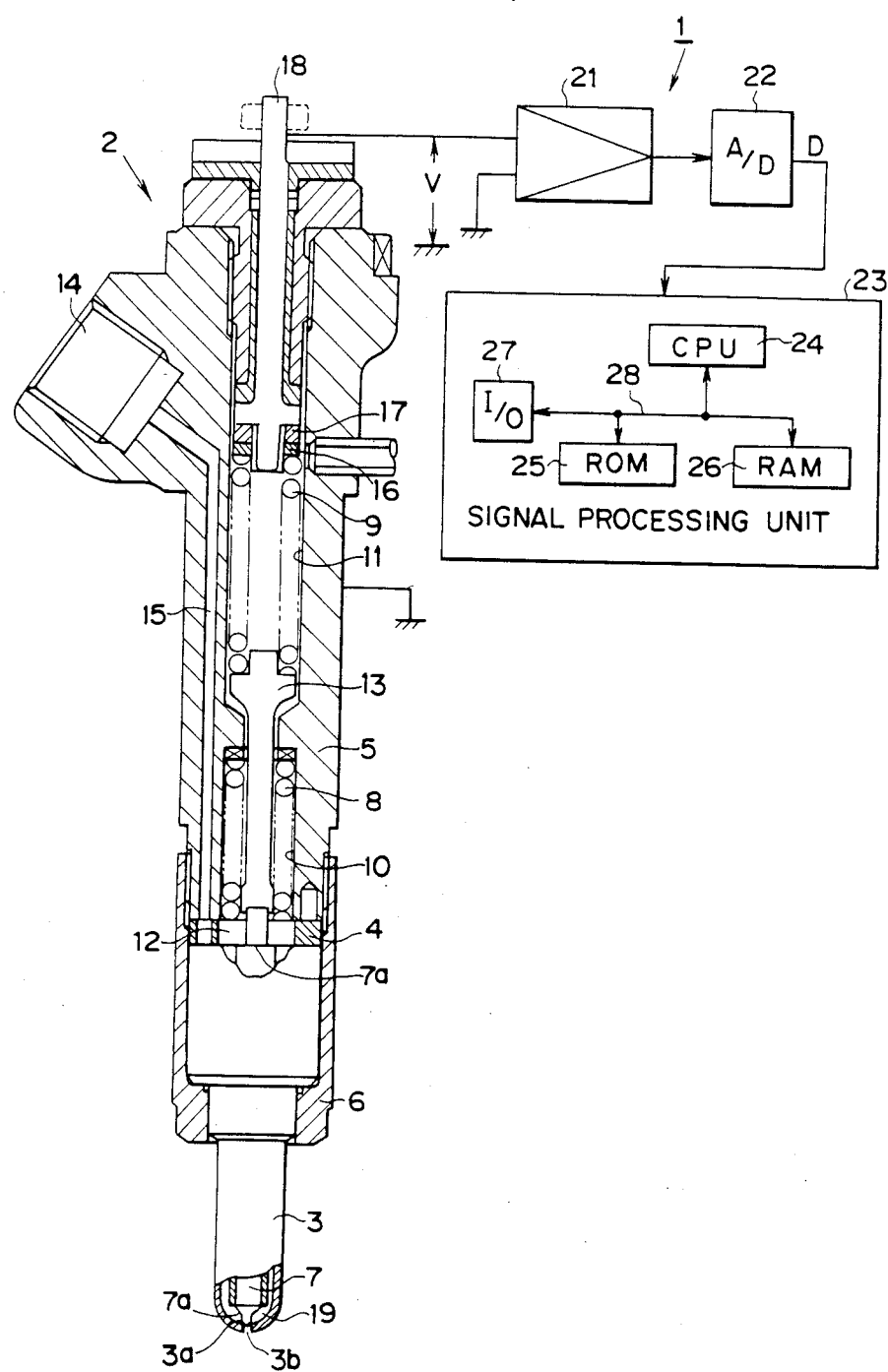
FIG. 1 is a view schematically showing an embodiment of a fuel injection performance detecting system including a sectional view of a fuel injection valve.

FIG. 1 shows a fuel injection performance detecting system 1 according to the present invention. In this system, which is for obtaining information concerning the fuel injection performance of a fuel injection valve 2, the fuel injection valve 2 has a nozzle 3, a plate member 4 and a nozzle holder 5, which are threaded into a sleeve nut 6, and a nozzle needle 7 is received in the nozzle 3. A first spring member 8 and a second spring member 9 are located behind the nozzle needle 7 and are accommodated in a first chamber 10 and a second chamber 11 defined in the nozzle holder 5. The first spring member 8 is adapted to bias the needle valve 7 toward an associated valve seat 3a through a disc-like member 12 coupled with the rear end portion 7a of the nozzle needle 7. The second spring member 9 is also adapted to bias the needle valve 7 toward the valve seat 3a through a push rod 13 aligned with the nozzle needle 7. As a result, the nozzle needle 7 is made to seat on the valve seat 3a by the tensions of the first and second spring member 8 and 9.

Pressurized fuel supplied from an inlet port 14 is supplied through a fuel passage 15 to a pressure chamber 19 defined in the tip portion of the nozzle 3. The nozzle needle 7 is lifted off from the valve seat 3a when the pressure acting on the pressure taper 7a of the nozzle needle 7 exceeds the force of the first and second spring members 8 and 9, namely the nozzle opening pressure, and the fuel injection valve 2 injects fuel from an injection hole 3b during the period that the nozzle needle 7 is separated from the valve seat 3a.

The upper end of the second spring member 9 is forcefully contacted through an electrode plate 16 with one end face of a piezoelectric element 17, and the other end face of the piezoelectric element 17 is electrically connected with an electrode 18 fixed to the nozzle holder 5 in such a way that the electrode 18 is electrically insulated from the nozzle holder 5. As a result, one end face of the piezoelectric element 17 is electrically connected with the nozzle holder 5, which is made of an electrically conductive material such as iron or the like, and the other end face thereof is electrically connected with the electrode 18.

With this arrangement, when a shock wave is produced in the second spring member 9 at the start of the movement of the nozzle needle 7 to inject fuel, the piezoelectric element 17 generates a voltage signal across the opposite end faces thereof of a magnitude relating to the magnitude of the shock wave applied to the piezoelectric element 17. The voltage signal is derived between the nozzle holder 5 and the electrode 18 as an output voltage V.

The output voltage V developed by the piezoelectric element 17 is amplified by an amplifier 21 and the amplified voltage signal from the amplifier 21 is converted into digital form by an analog-digital (A/D) converter 22 to obtain output voltage data D, which is applied to a signal processing unit 23.

The signal processing unit 23 has a conventional microcomputer system which comprises a central processing unit (CPU) 24, a read-only memory (ROM) 25, a random access memory (RAM) 26, an I/O interface 27 and a bus 28 for interconnecting the components mentioned above, and the output voltage data D is processed in accordance with a processing program stored in the ROM 25 in advance, to obtain information concerning the fuel injection performance.

Figure 2:
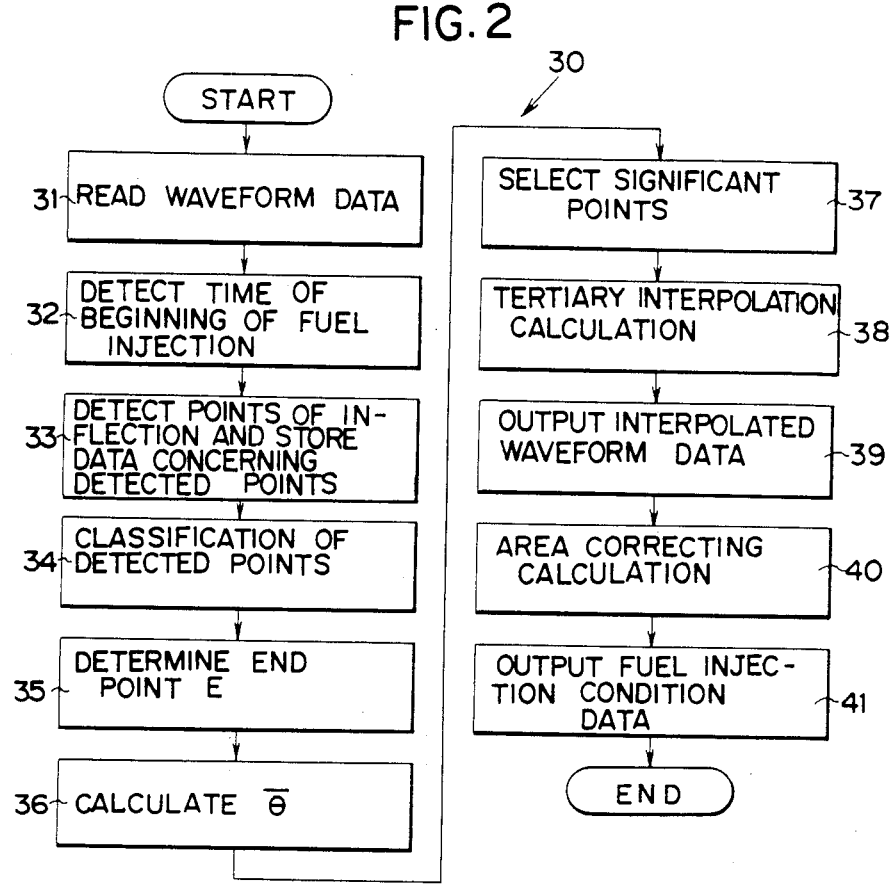
FIG. 2 is a flowchart showing a program executed in the signal processing unit of the fuel injection performance detecting system shown in FIG. 1.
Figure 3:
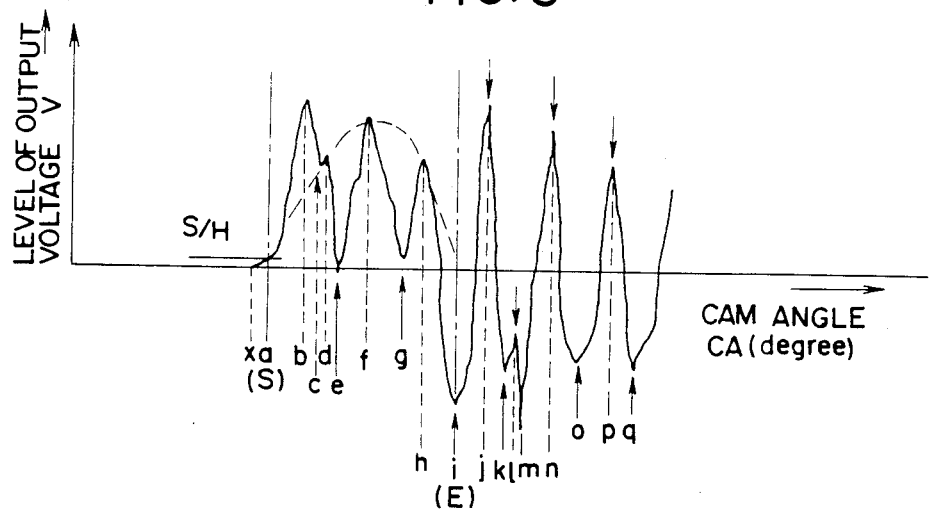
FIG. 3 is a view illustrating an example of the wave corresponding to the shock wave occurring in the spring of the fuel injection valve, which is to be processed by the signal processing unit shown in FIG. 1.

FIG. 2 is a flowchart of the processing program 30 stored in the ROM 25, and a description of the operation for processing the wave shown in FIG. 3 in accordance with the processing program 30 will be now made with reference to the flowchart shown in FIG. 2.

An example of the wave form of the output voltage V is shown in the graph of FIG. 3, in which the cam angle CA of a fuel injection pump (not shown) is plotted on the abscissa and the level of the output voltage V is plotted on the ordinate. In the case of the example shown in FIG. 3, supply of pressurized fuel from the fuel injection pump to the fuel injection valve 2 starts when CA=X, and the nozzle needle 7 is lifted off to apply the impact force to the second spring member 9. This impact force causes a shock wave which travels to and fro in the second spring member 9, so that a pressure of varying level is periodically is applied to the piezoelectric element 17. That is, since the nozzle needle 17 is suddenly lifted off due to the injection of the pressurized fuel, the shock wave is produced at the end of the second spring member 9 on the nozzle needle side. This shock wave travels back and forth at a predetermined period between the end portion of the second spring member 9 on the nozzle needle side and the end portion thereof on the piezoelectric element side, so that a pressure whose magnitude varies periodically acts on the piezoelectric element 17. Each peak of the wave shown in FIG. 3 represents the magnitude of a shock wave traveling in the second spring member 9 from its end on the nozzle needle side to its end of the piezoelectric element side. When the nozzle needle 7 has been lifted off the valve seat 3a, that is, when it is in its open state for fuel injection, since the shock wave traveling toward the nozzle needle 7 in the second spring member 9 is affected by the fuel pressure acting on the nozzle needle 7 when it reflects at the end portion of the second spring member 9 on the nozzle needle side, each peak caused by the shock wave coming from the nozzle needle side depends upon the magnitude of the fuel pressure at the injection hole at that time.

The processing program 30 shown in FIG. 2 is arranged to select only the significant peaks from among the peak of the wave shown in FIG. 3, and the processing operation for obtaining data relating to the fuel injection performance is carried out on the basis of the selected peaks as described in more detail below.

After the start of execution of the processing program 30, data corresponding to the wave shown in FIG. 3 is read as a wave form data in step 31 and a cam angle position s representing the fuel injection start time is detected in step 32. The detection in step 32 is carried out by detecting the cam angle at which the level of the wave form first becomes equal to a prescribed reference level S/H. The detected cam angle a is determined as the fuel injection start time in a manner similar to that of the conventional detecting system mentioned earlier.

Then, the operation moves to step 33 wherein the cam angle of the occurrence of each point of inflection, that is, the local maximum and local minimum values, and the corresponding output voltage level are detected. In the example wave, the local maximum points and the local minimum points occur at the cam angles b to q, respectively, and the data showing the levels Lb to Lq at the cam angles b to q respectively are stored in the RAM 26 together with data showing the cam angles b to q.

The operation then moves to step 34 wherein the points of inflection at which the level may depend upon the condition of fuel injection are selected from among the points of inflection obtained in step 33 to classify them. That is, the points of inflection selected in step 34 are those produced when the shock wave arrives at the piezoelectric element side of the second spring member 9, i.e. the cam angles b, d, f, h, j, l, n, and p in FIG. 3.

The operation further moves to step 35 wherein latter of the two consecutive minimum local points between which the the greatest change occurs is detected. This points is called the end point E and in FIG. 3 it is the cam angle i. The largest change between the two consecutive minimum points occurs when the nozzle needle 7 is reseated on the valve seat 3a after the nozzle needle 7 has once been lifted off the valve seat 3a to open the fuel injection valve 2, and the end point E is substantially the point at which the fuel injection operation is completed.

The operation then moves to step 36 wherein the average period θ of the wave illustrated in FIG. 3 is calculated, and the significant points of inflection are selected in step 37 from among the points selected in step 34 on the basis of the average period θ calculated in step 36.

Specifically, the following discriminations are made in step 37 in order to determine whether or not a candidate point of inflection should be selected as a significant point:

(i) Is the candidate point located between the u point S and the end point E?

(ii) Is the difference between the cam angle of the candidate point and the cam angle of the next following point within 80 percent of the cam angle range of the average period θ?

When the determination in (i) is YES and the determination in (ii) is NO, the candidate point of inflection is selected as a significant point. In the case of the example shown in FIG. 3, as the result of the discrimination in (i) of step 37, the points at the cam angles b, d, f and h are selected. Next, as the result of the discrimination in (ii), the points at the cam angles d, f and h are selected because the cam angle between b and d is less than $0.8 \times \theta$.

In this embodiment, the determination of the significant points of inflection is made on the basis of the average period θ as described above. However, the present invention is not limited to this manner of selection. For example, from among the points of inflection between the cam angle a and the cam angle i, the points satisfying both of the following conditions may be selected as the significant points of inflection:

(a) The points is produced when the shock wave traveling the second spring member 9 toward the piezoelectric element 17 reaches the end of the second spring member 9 on the side of the piezoelectric element 17.

(b) The point is not the first point among the points which satisfy the above condition (a).

The operation next moves to step 38 wherein a tertiary interpolation calculation is carried out on the basis of data showing cam angles d, f and h corresponding to the selected significant points and data showing levels Ld, Lf and Lh at the selected significant points of inflection. In step 39, the interpolated wave form data showing the injection rate curve is output in step 39. The injection rate curve is shown in FIG. 3 by a broken line. In summary, the selected points of inflection at the cam angles d, f and h correspond to three points on the actual fuel injection rate curve at that time, and data representing the fuel injection rate curve is obtained by carrying out the tertiary interpolation calculation on the basis of the data concerning the points of inflection selected in step 37.

In step 40, in order to obtain data showing the quantity of fuel injected, an area correcting calculation is carried out on the basis of the interpolated wave form data obtained in step 39 and the quantity of fuel injected at that time can be calculated from the result of the area correcting calculation.

As described above, fuel injection start time (S), the fuel injection rate and the quantity of fuel injected can be determined on the basis of the data represented by the wave shown in FIG. 3.

In this embodiment, the output voltage signal produced by the piezoelectric element 17 is processed by means of a microcomputer in accordance with the present invention. However, the signal processing operation according to the present invention may alternatively be realized by the use of an appropriate circuit means other than a digital microcomputer system.

We claim:

1. A method for detecting the fuel injection performance of a fuel injection valve in which a nozzle needle is biased toward an associated valve seat by a spring member in such a way that the nozzle needle is lifted off from the valve seat to inject fuel when pressurized fuel is supplied thereto, said method comprising steps of:

detecting at one end of the spring member time-course change in magnitude of a shock wave produced in the spring member when fuel is injected from the fuel injection valve; and determining time-course change in the pressure of injected fuel acting on the nozzle needle during the fuel injecting operation of the fuel injection valve on the basis of the time-course change in magnitude of the shock wave returning from the nozzle needle side end in the spring member by reflection.

2. A method as claimed in claim 1, wherein the magnitude of the shock wave is electrically detected by means of a piezoelectric element placed at the end of the spring member on the side opposite to the nozzle needle.

3. A method for detecting the fuel injection performance of a fuel injection valve in which a nozzle needle is biased toward an associated valve seat by a spring member in such a way that the nozzle needle is lifted off from the valve seat to inject fuel when pressurized fuel is supplied thereto, said method comprising steps of:

detecting at one end of the spring member electric data corresponding to a wave form of a shock wave by means of a piezoelectric element, the shock wave being produced in the spring member when fuel is injected from the fuel injection valve;

detecting a start time at which the fuel injection operation of the fuel injection valve starts on the basis of the electric data;

detecting an end time at which the fuel injection operation of the fuel injection valve is completed on the basis of the electric data;

determining significant points of inflection of the wave form between the start time and the end time; and determining a fuel injection rate curve on the basis of data concerning the determined significant points of inflection.

4. A method as claimed in claim 3, wherein the start time is determined by detecting a time at which the level of the wave form shown by the electric data first becomes equal to a prescribed reference level.

5. A method as claimed in claim 3, wherein the end time is determined as a time point at which change between two consecutive local minimum points in the wave form is greatest.

6. A method as claimed in claim 3, wherein the significant points are selected among the points of inflection which occur by a shock wave coming from the nozzle needle side.

7. A method as claimed in claim 6, wherein the average period of the wave form is calculated and the significant points of inflection are finally selected on the basis of the calculated average period.

8. A method as claimed in claim 3, wherein the fuel injection rate curve is determined by tertiary interpolation calculation on the basis of data concerning the determined points of inflection.

9. A method as claimed in claim 3, wherein a fuel quantity is determined on the basis of the determined fuel injection rate curve.

10. A method as claimed in claim 9, wherein the calculation for obtaining the fuel quantity is carried out by an area correcting calculation.

* * * * *